United States Patent [19]

Ridgway

[11] Patent Number: 4,603,553

[45] Date of Patent: Aug. 5, 1986

[54] BALLISTIC COLD WATER PIPE

[75] Inventor: Stuart L. Ridgway, Santa Monica, Calif.

[73] Assignee: R & D Associates, Marina del Rey, Calif.

[21] Appl. No.: 680,352

[22] Filed: Dec. 11, 1984

[51] Int. Cl.⁴ .............................................. F03G 7/04
[52] U.S. Cl. ................... 60/641.7; 137/236.1
[58] Field of Search ............... 60/641.7; 137/13, 236 S

[56] References Cited

U.S. PATENT DOCUMENTS 4,245,475  1/1981  Girden .............................. 60/641.7
4,441,321  4/1984  Ridgway .......................... 60/641.7

Primary Examiner—Allen M. Ostrager
Attorney, Agent, or Firm—Poms, Smith, Lande et al.

[57] ABSTRACT

In order to bring cold water from the depths of a body of water, a long pipe is extended into the body of water. Arrangements are provided for pumping the water out of the pipe. A nozzle is then provided to direct a stream of water up through the pipe at high velocities, without touching the walls thereof, based on the high pressure of the water at the lower end of the pipe. At the top of the pipe near the surface of the body of water, arrangements are provided for collecting the cold water drawn from below. This ballistic cold water pipe may be employed to economically provide cold water for ocean thermal energy conversion (OTEC) systems, and for other purposes.

20 Claims, 8 Drawing Figures

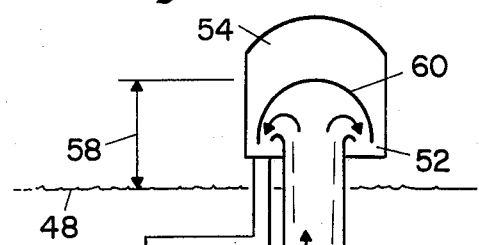
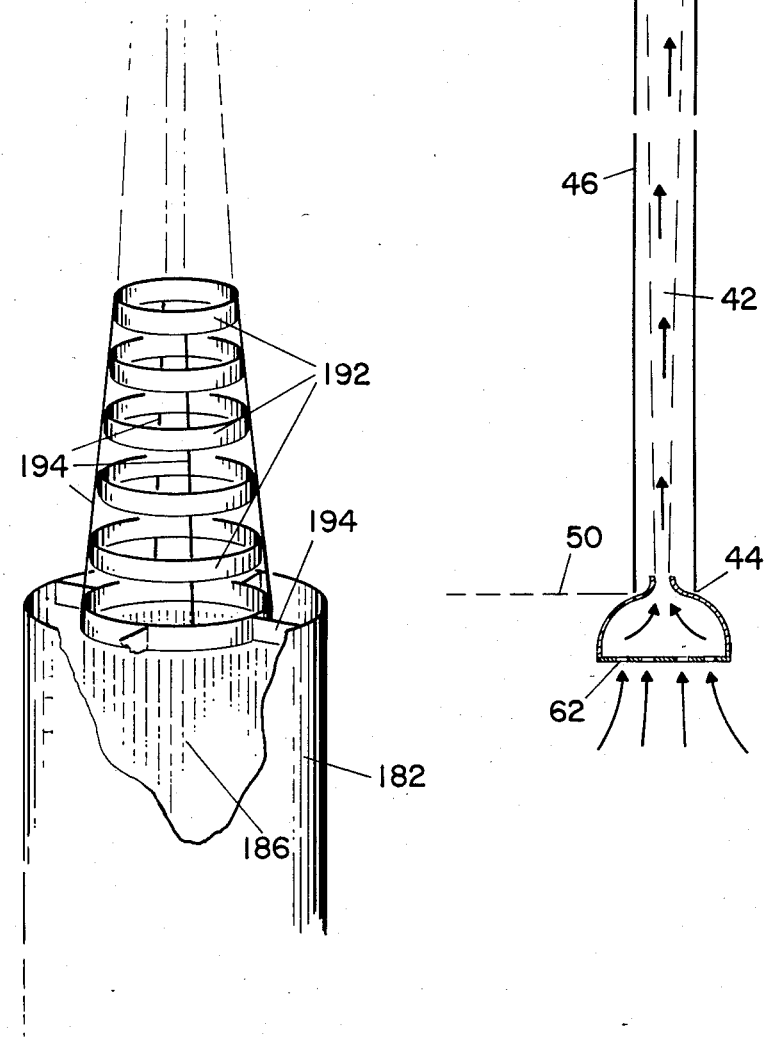

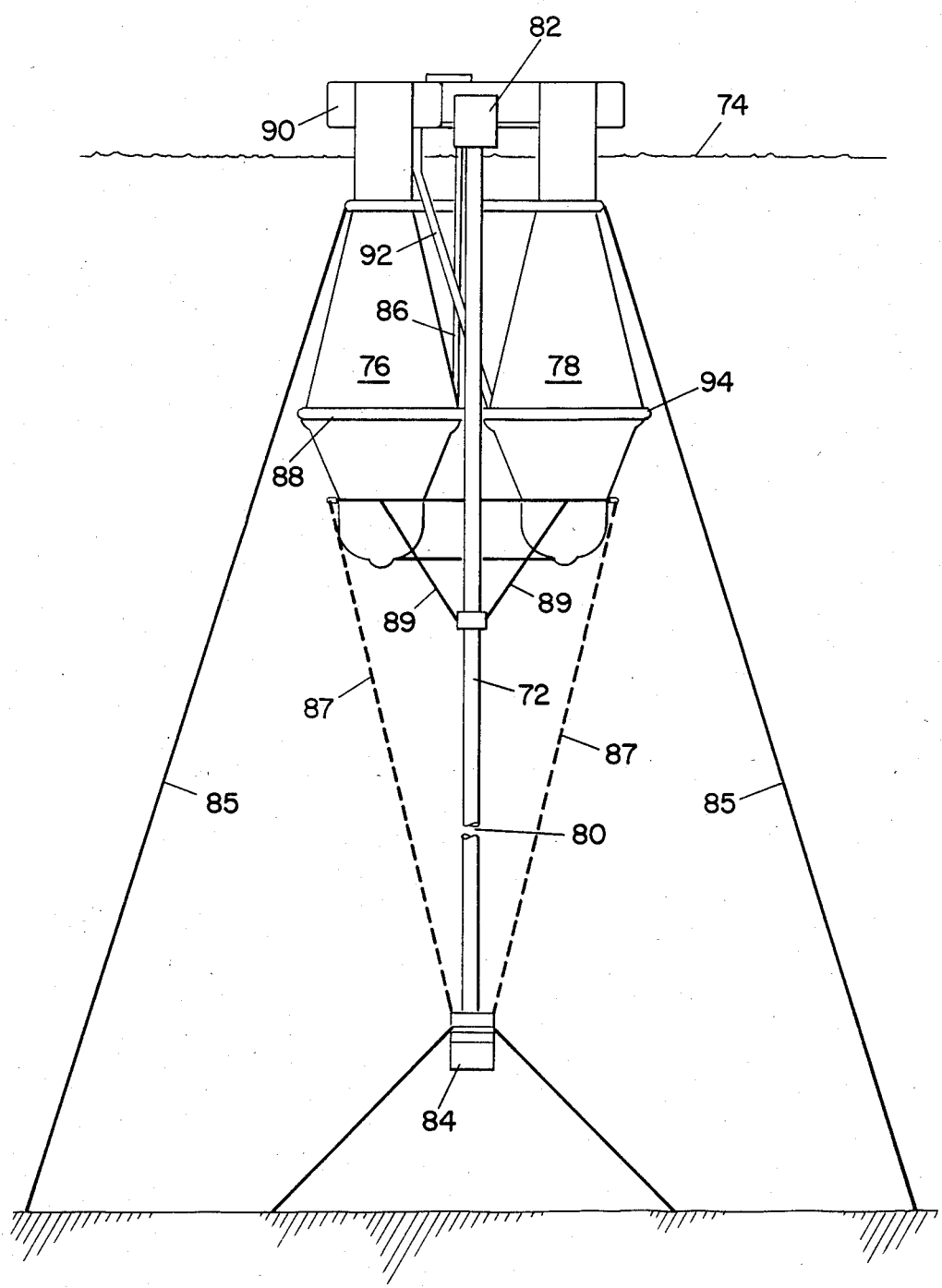

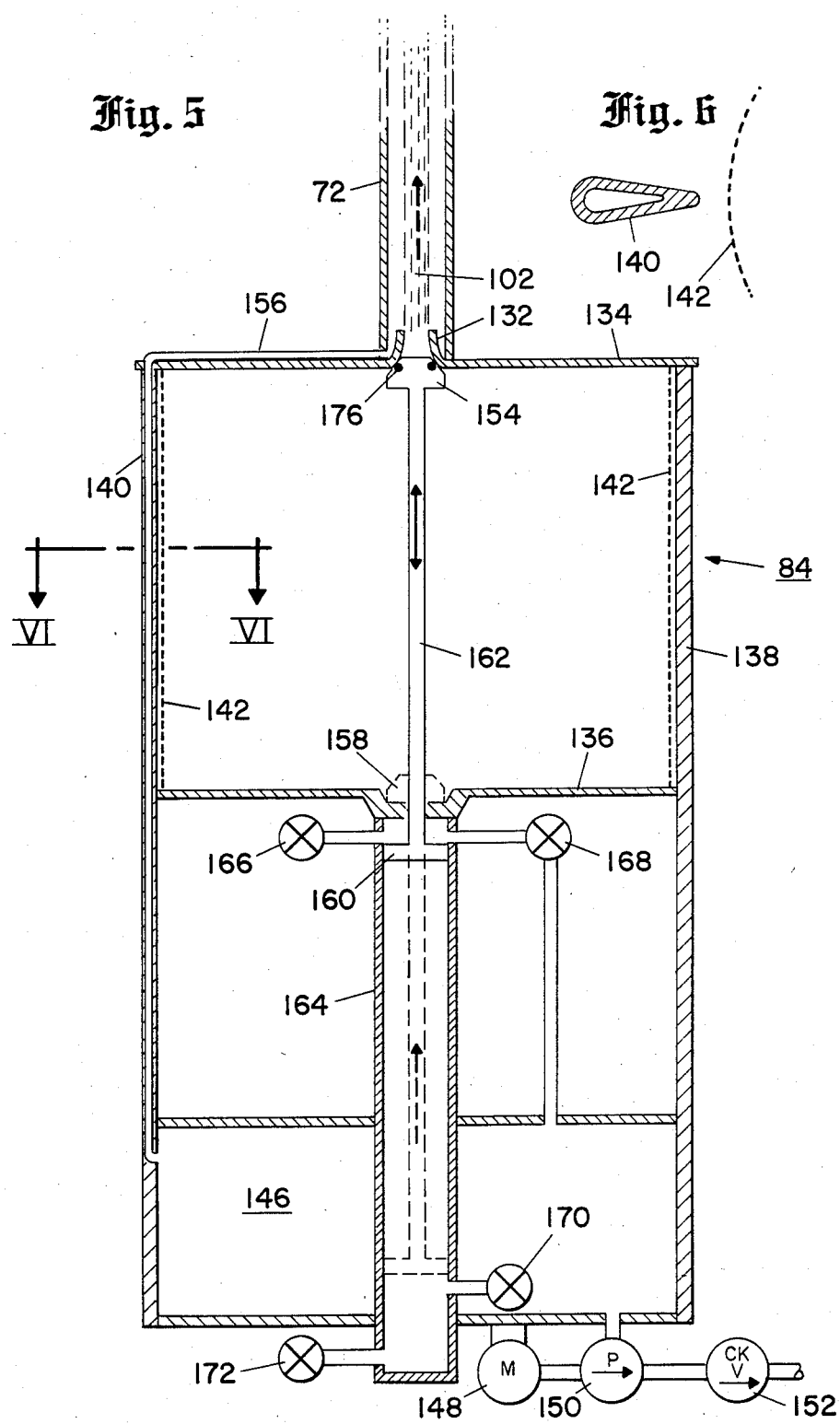

BALLISTIC COLD WATER PIPE

FIELD OF THE INVENTION

This invention relates to cold water pipes for drawing water from the depths of bodies of water.

BACKGROUND OF THE INVENTION

In ocean thermal energy conversion systems, such as that shown in U.S. Pat. No. 4,441,321, granted Apr. 10, 1984, the difference in temperature between the surface water, normally at about 20 or 25 degrees C. and cold water (approximately 5 degrees C.) from a few hundred meters below the surface of the ocean, is employed to generate power in a turbine or the like. This power generation may be accomplished in a large number of ways, and the patent identified above employs a mist lift geometry in the implementation of the power generation.

In bringing the cold water from the depths of the ocean, relatively large quantities of water are required, and the depth from which it must be brought may be as much as five hundred or six hundred meters. The diameter of a suitable pipe as included in previously proposed OTEC systems, may be in the order of 8 feet or even up to 30 feet, for large power generating capacity units. The cost of the cold water pipe for a relatively small OTEC plant may be in the order of several million dollars, and may represent nearly one-third of the cost of the unit.

Accordingly, a principal object of the present invention is to reduce the cost of bringing cold water from the depths of a body of water up to the vicinity of the surface of the water.

SUMMARY OF THE INVENTION

In accordance with the present invention, the cost of a cold water pipe of the type discussed above can be greatly reduced, by directing a small diameter stream of water at relatively high velocities up through a pipe, with the stream of water spaced from the side walls of the pipe. Using this concept, with a nozzle at the bottom of the pipe, a jet of water is directed upwardly up through the center of the pipe and spaced from the side walls thereof. Associated with the installation are arrangements for emptying the pipe prior to the initiation of the jet stream of water, and arrangements for collecting the water in the vicinity of the surface of the body of water.

In accordance with one important aspect of the invention, the water may be utilized to assist in the condensing of water vapor in the course of part of the cycle of an ocean thermal energy conversion (OTEC) system. In one embodiment, the water may be collected near the surface of the body of water, and then employed to accomplish the desired functions in connection with the OTEC system; and in another embodiment, the stream of cold water from the depths of the body of water may be directed within an OTEC mist flow chamber and employed in the dynamic condensation of the water vapor employed in the mist flow chamber geometry.

Advantages of the invention include reducing the cost of the cold water pipe for OTEC or other similar systems to a minor fraction of their present cost, and reducing the cross section of the systems exposed to water currents, so that the structure may be more readily held in position in the ocean or other large body of water.

Other objects, features and advantages of the invention will become apparent from a consideration of the following detailed description and from the accompanying drawings.

BRIEF DESCRIPTION OF THE DRAWINGS

FIG. 2 is a diagrammatic view of an OTEC system indicative of the principles of the present invention;

FIG. 3 is a diagrammatic view of an OTEC system utilizing the principles of the present invention;

FIG. 5 is a schematic cross-sectional view of a nozzle, sump pump and chamber, and other structures which may be located at the base of the cold water pipe;

FIG. 6 is a cross-sectional view taken along lines V—V of FIG. 4;

FIG. 8 shows one implementation of a water stream diverter which may be employed in the system of FIG. 7.

DETAILED DESCRIPTION

Figure 1:
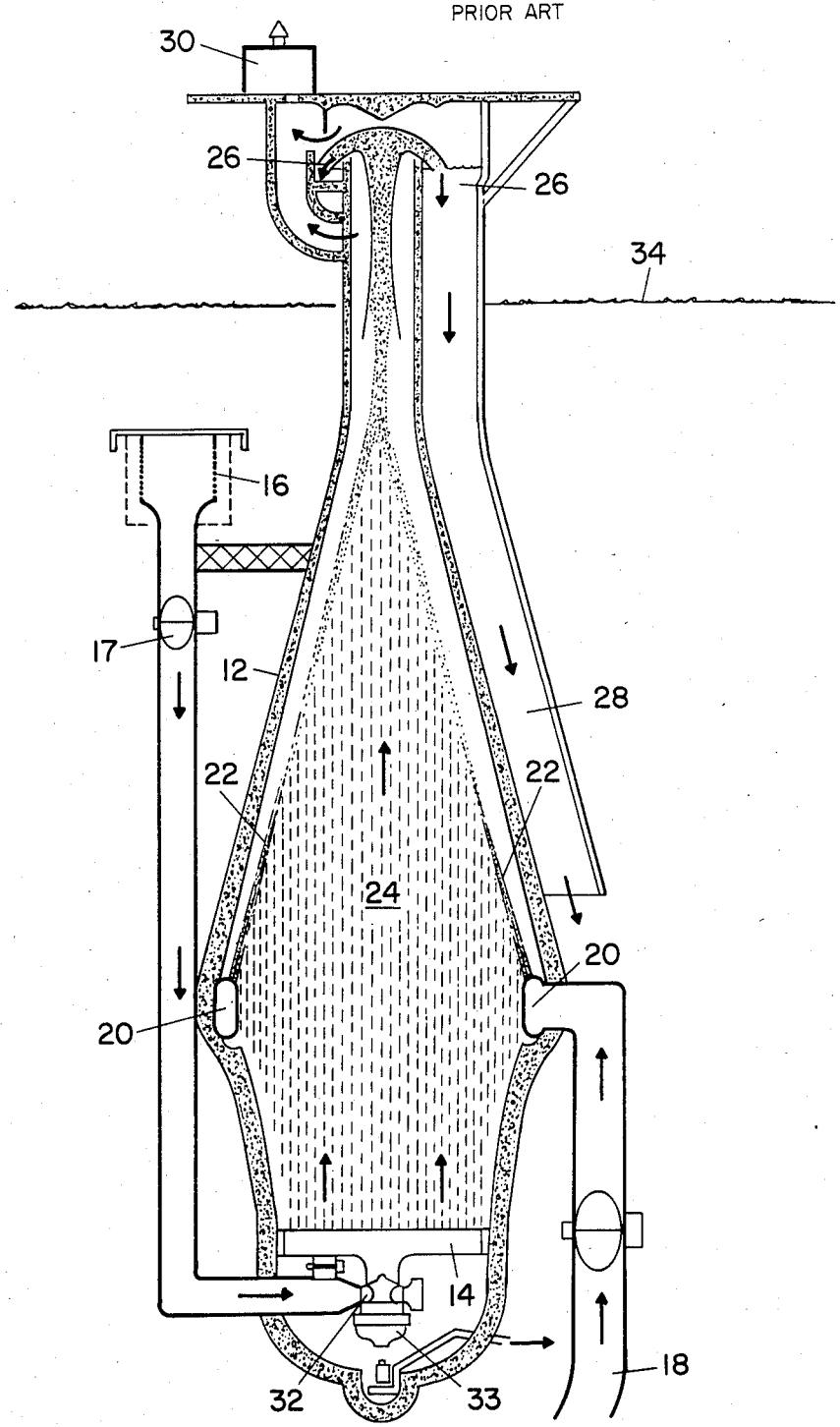
FIG. 1 is a schematic cross-sectional view of a prior art OTEC system.

FIG. 1 is a schematic cross-sectional view of a prior art OTEC system, of the type generally as shown and described in my prior U.S. Pat. No. 4,441,321 granted Apr. 10, 1984. Concerning the structure shown in FIG. 1, it includes an outer reinforced concrete shell or housing 12, a mist generator 14, a warm water intake filter 16 and associated valve 17, and a cold water pipe 18 which brings water up from the ocean depths to a cylindrical manifold 20 from which a cold water sheet 22 is sprayed upwardly just inside the walls of the chamber 12, to condense and coalesce the water vapor and warm water droplets 24. The water which has been raised by the mist flow process, is collected in the basin 26 and the mixed water is discharged through the pipe 28.

The vacuum pump 30 provides a substantial vacuum within the housing 12. Electrical power is generated by the water turbine 32 combined with generator 33, located just below the mist generator 14, as a result of the pressure head between the input point at filter 16 and the low pressure volume within the housing 12. The main portion of the housing 12 extends to a point which may be in the order of 60 or 80 meters below the surface 34 of the ocean; and the cold water input pipe 18 extends downwardly to where the ocean water is quite cold, in the order of 5 degrees C., perhaps 600 meters or more below the surface of the ocean.

Because of the high volume of water which is required, and the increased frictional loss at high speeds of water flow in engagement with a pipe, the diameter of the pipe 18 must be relatively large, in order to avoid energy or pressure losses as the cold water flows upwardly to the manifold 20. In analyzing the costs for an ocean thermal energy conversion system, of this type shown in FIG. 1, it developed that the cost of the very large cold water pipe, extending many hundred meters below the surface of the ocean, and sufficiently rigid to maintain the pressure differentials which are involved, was a large proportion, as much as 40 percent, of the cost of the entire structure.

FIG. 2 of the drawings is a diagrammatic conceptualization of important features of the present invention. More specifically, with reference to FIG. 2, a jet of water 42 is directed upwardly by the nozzle 44 so that the water jet is spaced away from the walls of an enclosing pipe 46 which extends from the surface 48 of a large body of water to a depth 50 in the order of 600 meters or more below the surface of the ocean. Also indicated schematically in FIG. 2 is a collection basin 52, a vacuum chamber 54 and a utilization equipment such as an OTEC power plant 56. As indicated by the arrows 58, the head for the maximum point 60 of the jet of water 42 may extend above the surface of the ocean 48 by a distance equal to approximately 30 feet, representing the column of water required to produce one atmosphere of pressure. Of course, this head will be reduced somewhat by frictional losses in the nozzle 44, and therefore will only be about 8 or 9 meters above the surface of the ocean 48, rather than 10 or more meters. In this connection, it is known that nozzles if properly constructed with high surface smoothness, may have an efficiency between 99 and 100 percent. Also indicated schematically in FIG. 2 is a valve 62 for controlling the flow of water into the nozzle 44.

FIG. 3 is a diagrammatic showing of a more complete ocean thermal energy conversion system, using a ballistic cold water tube 72. In FIG. 3, the ballistic tube 72 is located centrally, and comes to the surface 74 of the ocean between two ocean thermal energy conversion chambers 76 and 78 which are similar to the unit shown in FIG. 1 of the drawings. In FIG. 3, the drawing is not to scale, as the units 76 and 78 would normally extend about 50 to 100 meters into the ocean, while the cold water tube 72 would extend to draw ocean water from a depth of about 500 or 600 meters. The break 80 shown along the length of the cold water tube 72 indicates that the pipe 72 as shown in FIG. 3 is considerably shorter than its actual length or depth relative to the scale of the OTEC chambers 76 and 78.

Figure 4:
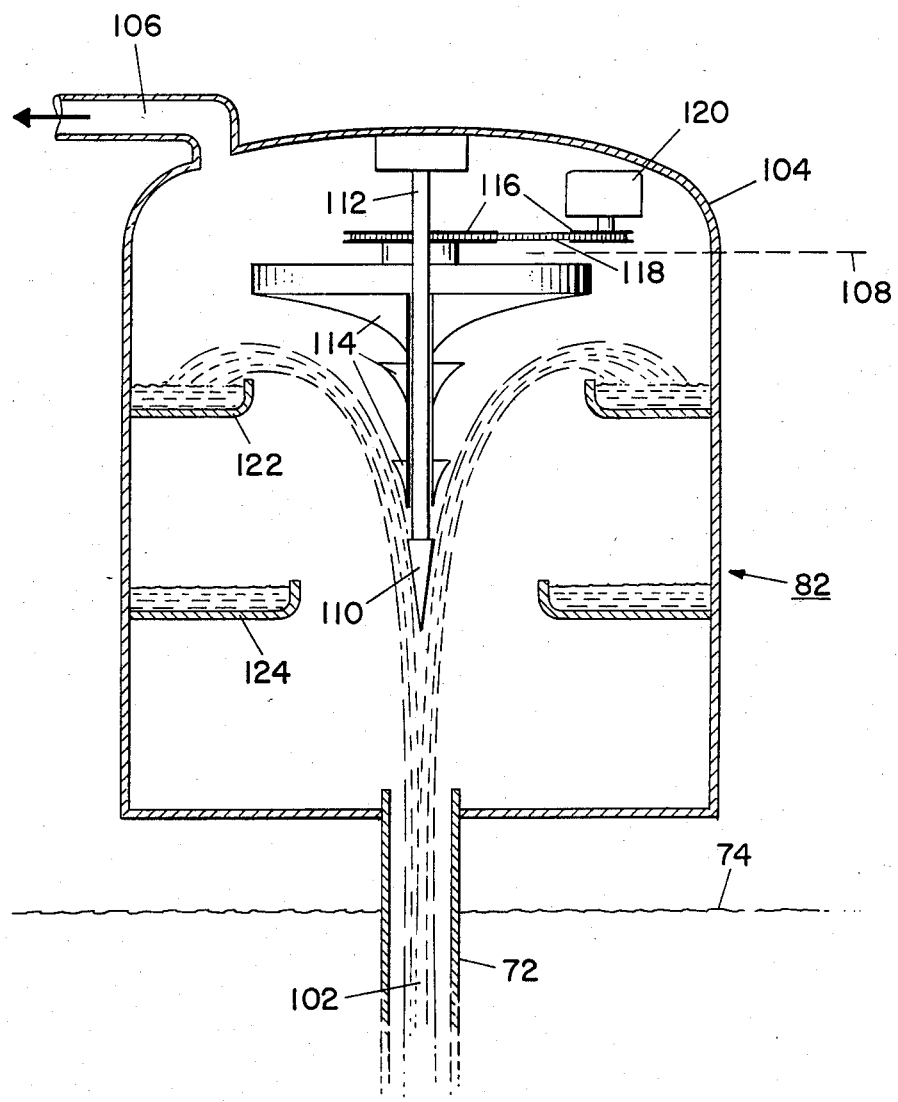
FIG. 4 is a diagrammatic cross-sectional view of a ballistic cold water pipe catcher, illustrating one component which may be utilized in the implementation of the present invention.

The catcher arrangements 82 for receiving the jet of water passing up through the pipe 72 is shown in greater detail in FIG. 4; while the nozzle and valving assembly 84 is shown in greater detail in FIG. 5 of the drawings. Various guy wires and cables 85, 87, 89 are provided for holding the assembly in place and the pipe 72 straight and vertical, to facilitate the projection of the jet of cold water accurately up through the length of the tube. Once the cold water has been caught in the catcher assembly 82, it may be directed downwardly through the pipe 86 to the manifold 88 which encircles the mist lift chamber 76. Mixed water is collected at 90 at the top of the mist lift chamber 76 and this relatively cool water may be directed through the channel 92 to the manifold 94 which encircles the mist lift chamber 78 to be used in the condensing of the mist, water vapor, and droplets arising within chamber 78 as discussed hereinabove in connection with FIG. 1 of the drawings, and the manifold 20 associated therewith.

Referring now to FIG. 4, it shows the top of the ballistic cold water pipe 72, the central jet of water 102, and the catcher assembly 82 mounted top the pipe 72. The housing 104 is connected to a large vacuum pump by the conduit 106. In the absence of any frictional losses, the jet 102 would rise to a distance approximately 10 meters above the surface of the ocean 74. However, with the losses primarily from the nozzle, being less than 1%, the jet water 102 will rise approximately to the level indicated by the dashed line 108. In order to prevent the jet from falling down upon itself and filling up the pipe 72, a central pointed structure including the sharp generally conical tip 110 is provided. The tip 110 is mounted on a heavy rod or shaft 112 upon which centrifugal impellers 114 may be mounted for rotation in any suitable manner such as by the pulleys 116 and belt 118 driven by the motor 120. If, due to jet misalignment the diverter 110 does not establish the desired flow, the jet will proceed upward to the impellers 114. These impellers 114 will direct water outwardly into the peripheral catching basin 122, and to a lesser extent to the lower catching basin 124. The water so caught will be held in suitable intermediate storage at the elevated level, and directed downwardly through the pipe 86, as indicated in FIG. 3.

As shown in FIG. 5, at the lower end of the pipe 72, the nozzle and valve assembly 84 is attached. The nozzle 132 extends upwardly into the lower end of the pipe 72. Extending outwardly smoothly from the nozzle 132 is a circular upper plate 134 to which six peripheral vertical columns are attached to extend downwardly to a lower circular plate 136. Two of the columns 138 and 140 are shown in FIG. 5. Immediately within the six columns, including columns 138 and 140, and spaced from these columns by about 6 or 8 inches, is a calming screen assembly 142, which is included to reduce the turbulent velocity components of water within the chamber 84 en route to the nozzle 132.

Toward the bottom of the structure 84 is the sump chamber 146. Associated with the sump chamber 146 are the motor 148, the pump 150 and the check valve 152. Prior to the initiation of the jet of water 102 by retraction of the valve member 154 from the nozzle 132, the ballistic pipe 72 must be emptied of water. This is accomplished by the conduit 156 extending from the lower end of the pipe 72 at its left-hand side shown in FIG. 5, down through the column 140 to the sump chamber 146. The valve 154 may be shifted to its retracted position, as shown in dashed lines at reference numeral 158, by the piston 160 connected by the rod 162 to the valve member 154. The piston 160 is mounted within a cylindrical chamber 164 to which various high pressure electromagnetically actuated valves 166, 168, 170 and 172 are attached. When it is desired to open the valve 154, the valve 170 is opened into the sump chamber, and the high pressure valve 166 opening into the ocean, is opened. This places high pressure onto the upper surface of the piston 160 and moves the valve and piston assembly downwardly, thereby opening the valve 154. When it is desired to close the valve 154, the procedure is reversed, and with valve 166 closed and valve 168 opened into the sump, the high pressure valve 172 is opened, and the piston member is moved upwardly to close valve 154. One or more resilient sealing rings 176 may be provided on the surface of the valve 154 which mates with the nozzle 132. Suitable high pressure valve relief arrangements may be provided to facilitate the opening of the valve 154 under high pressure conditions. However, as these techniques are known per se, they will not be described in detail here.

Figure 7:
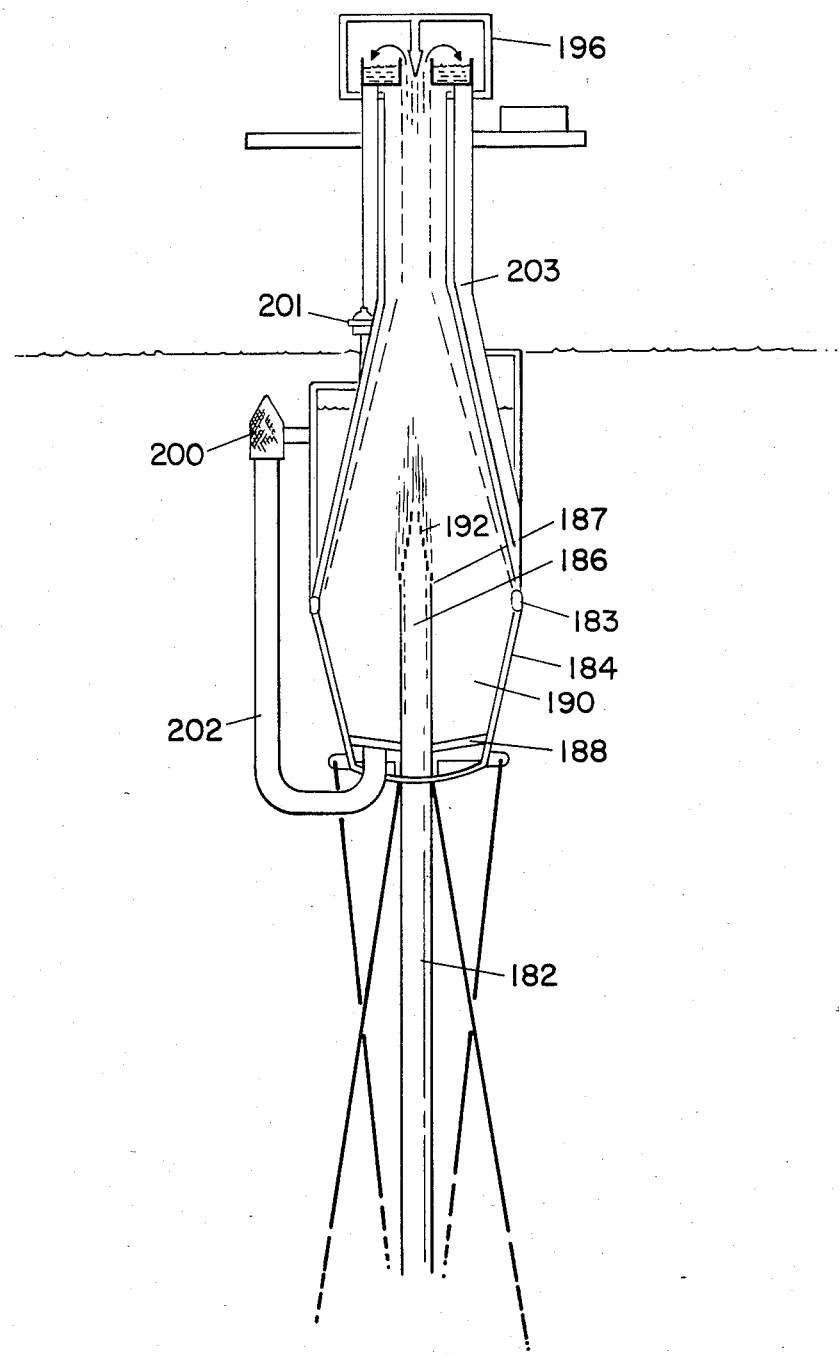
FIG. 7 is a schematic cross-sectional view of another alternative arrangement illustrating the principles of the present invention.

FIGS. 7 and 8 show an additional embodiment of the invention in which the ballistic cold water pipe 182 is connected directly to the bottom of the mist flow housing 184 rather than being brought to the surface of the ocean where the cold water was collected in earlier embodiments of the invention disclosed in this specification. In the arrangements of FIG. 7, in addition to providing a peripheral manifold 183, and spray 185, such as that shown at 20, 22 in FIG. 1, the jet of cold water 186 is supplied to the center of the housing 184 by the extension of the cold water pipe 182 up to point 187 a substantial distance into chamber 184, and performs supplemental condensing and cooling function from the center of the apparatus in addition to the peripheral cold water sheet. As a part of the arrangements of FIG. 7, the mist formation structure 188 has a central aperture through which the cold water jet 186 passes, and the mist spray structure 188 is tilted slightly toward the center of the structure so that, following the initial acceleration in the lower zone 190 of the housing 184, the mist starts to impinge upon the central jet of water, which is in turn broken up into multiple sheets of water by the structure 192, with its supports 194, so that it expands from a solid jet to more freely intermingle with the inwardly directed mist flow from the spraying units 188.

The mixed water collecting arrangements 196 may be comparable to those discussed hereinabove in connection with other embodiments of the invention. Further, the nozzle, valving, sump and other structures at the lower end of the cold water pipe 182 may be the same as that disclosed hereinabove in connection with FIG. 5 of the drawings. Similarly, the warm water inlet and filter structure 200 and valve 202 may be of the structure mentioned hereinabove or in prior patents cited in the present application. A generator 201 may be located just above the normal water level. Mixed cool water is supplied to manifold 183 from the catcher structure 196 through pipe 203.

FIG. 8 shows the structure 192, 194, in somewhat greater detail. More specifically, the structure 192 for breaking up the periphery of the jet of cold water 186 may include a series of very sharp and thin metallic rings 192, which may be supported by four or more vertical plates 194 extending inwardly from the upper end 187 of cold water pipe 182. The additional higher rings 192 of progressively decreasing diameter may each be supported at several points from the underlying ring.

It is useful to consider the equations and the numbers for one representative case. For purposes of illustration we will choose a depth of 670 meters and a flow rate of 10 cubic meters per second.

The operative equations are as follows:

$$V = gt = 9.8t \tag{1}$$

$$S = \tfrac{1}{2}gt^2 \tag{2}$$

$$A = Q/V = \pi r^2 \tag{3}$$

where V is velocity; g is the acceleration of gravity, equal to 32 feet per second per second, or 9.8 meters per second per second; S is the distance, t is the time in seconds, A is the area of the jet of water; r is its radius, and Q is the flow rate.

Employing these equations it may be determined that, for a depth of 670 meters, with the vacuum adding another 10 meters, giving an effective depth of 680 meters, the velocity at the nozzle is 115.45 meters per second, the area is 0.8662 square meters and the diameter is 0.332 meters or about 13.1 inches. With the nozzle opening being slightly more than 1 foot in diameter, the lower end of the pipe would be about two feet in diameter.

Near the top, where the velocity is becoming less, the pipe must be increased in diameter. Thus, at about 12.5 meters from the top of the pipe, the diameter of the jet would be about one meter, so the diameter of the pipe is about two meters. Key values and pipe dimensions at other points along the ballistic pipe may be calculated in a similar manner.

It is also noted that at a suitable point or points along the length of the pipe, the departure of the jet from concentricity can be measured, optically, electrically, or in accordance with other known methods, and water jets applied selectively at the necessary angles and intensity to restore concentricity. The source for the water jets would be a small low velocity pipe parallelling the ballistic cold water pipe.

The Coriolus force resulting from the earth's rotation should also be taken into consideration; and it is estimated that the stream of water may be deflected by a distance in the order of two feet as a result of this effect. Concerning the trajectory of the stream of water, and its collection, if desired, the stream and the cold water pipe may be oriented at a slight angle from the vertical, and the collector geometry would then utilize the transverse velocity of the water and thus extend to one side of the point of arrival of the stream at the collector.

In conclusion, it is to be understood that the foregoing detailed description and the accompanying drawings illustrate preferred embodiments of the invention. Various departures from the precise structures shown and described hereinabove may be employed in the course of implementing alternative arrangements within the scope of the present invention. Thus, by way of example and not of limitation, the cold water ballistic tube may be employed for purposes other than ocean thermal energy conversion, such as bringing water up from the depths because of certain content of the cold water, or for any other desired purposes. It is also noted that the nozzles may be formed in other configurations from that shown, with the main intent being to have relatively low frictional losses and high collimation of the water jet. These factors are preferably accomplished by having the nozzle relatively short, and having its inner surface polished to a high degree of surface smoothness. The cold water pipe may, of course, be employed in connection with OTEC systems other than mist lift-type systems, and has merely been shown in combination with such mist lift systems by way of convenience. Accordingly, it is to be understood that the present invention is not limited to the particular embodiments as shown in the drawings and as described in the detailed description portion of this specification.

What is claimed is:

1. An ocean thermal energy type conversion system for use near a large body of water having relatively cold water at a considerable depth beneath the surface thereof, comprising:
   a source of warm water;
   means for generating power from the difference in temperature between said warm water and said cold water; and
   means for bringing said cold water up from the depths of said body of water; said means including (1) a relatively straight pipe extending down into said body of water, (2) means for initially emptying said pipe of water, (3) nozzle means for directing a stream of water up into said pipe at high velocities with said stream spaced from the side walls of said pipe, and (4) means for collecting said water in the vicinity of the surface of said body of water.

2. An ocean thermal energy type conversion system as defined in claim 1 further comprising valve means for controlling the flow of water through said nozzle.

3. An ocean thermal energy type conversion system as defined in claim 2 further including hydraulic piston means for operating said valve.

4. An ocean thermal energy type conversion system as defined in claim 1 including a sump chamber coupled to the bottom of said pipe, and pump means for emptying said sump chamber.

5. An ocean thermal energy type conversion system as defined in claim 1 wherein said pipe has a substantially lesser diameter near the bottom thereof than at the top thereof.

6. An ocean thermal energy type conversion system as defined in claim 1 including calming screen means for reducing the turbulence of water entering said nozzle.

7. An ocean thermal energy type conversion system as defined in claim 1 wherein said collecting means includes means for engaging said stream of water and for directing it radially outward for collection, away from the axis of said pipe.

8. An ocean thermal energy type conversion system as defined in claim 1 including a mist lift chamber and means for directing said stream of water into said mist lift chamber.

9. An ocean thermal energy type conversion system as defined in claim 1 including means for supplying said cold water from said pipe to said power generating means.

10. An ocean thermal energy type conversion system as defined in claim 9 wherein said power generating means includes a mist lift chamber.

11. A system for efficiently and inexpensively raising cold water from the depths of a body of water comprising:
(1) a relatively straight pipe extending down into said body of water,
(2) means for emptying said pipe of water,
(3) nozzle means for directing a stream of water up into said pipe at high velocities with said stream spaced from the side walls of said pipe, and
(4) means for collecting said water in the vicinity of the surface of said body of water.

12. A system as defined in claim 11 further comprising valve means for controlling the flow of water through said nozzle.

13. A system as defined in claim 12 further including hydraulic piston means for operating said valve.

14. A system as defined in claim 11 including a sump chamber and pump means for emptying said sump.

15. A system as defined in claim 11 wherein said pipe has a substantially lesser diameter near the bottom thereof than at the top thereof.

16. A system as defined in claim 11 including calming screen means for reducing the turbulence of water entering said nozzle.

17. A system as defined in claim 11 wherein said collecting means includes means for engaging said stream of water and for directing it radially outward for collection, away from the axis of said pipe.

18. A system as defined in claim 11 including means for generating power from the difference in temperature between warm water at the surface of said body of water, and said cold water, and means for supplying said cold water from said pipe to said power generating means.

19. A system for efficiently and inexpensively raising water from the depths of a body of water comprising:
a relatively straight pipe extending down into said body of water;
nozzle means for directing a stream of water up into said pipe at high velocities with said stream spaced from the side walls of said pipe; and
means for collecting said water in the vicinity of the surface of said body of water.

20. A system as defined in claim 19 wherein said pipe extends down into said water for more than 100 meters.

* * * * *